United States Patent [19]

Naito et al.

[11] Patent Number: 5,257,311
[45] Date of Patent: Oct. 26, 1993

[54] SYSTEM FOR MONITORING ATM CROSS-CONNECTING APPARATUS BY INSIDE-APPARATUS MONITORING CELL

[75] Inventors: Hidetoshi Naito; Masaaki Kawai; Hisako Watanabe; Yuji Takizawa; Kazuyuki Tajima; Haruo Yamashita, all of Kawasaki, Japan

[73] Assignee: Fujitsu Limited, Kawasaki, Japan

[21] Appl. No.: 876,417

[22] Filed: Apr. 30, 1992

[30] Foreign Application Priority Data

Apr. 30, 1991 [JP] Japan .................. 3-128633

[51] Int. Cl.⁵ ............................................. H04L 9/00
[52] U.S. Cl. ..................................... 380/48; 380/46; 375/114; 370/100.1; 370/94.1
[58] Field of Search .............. 380/48, 46; 375/114; 370/100, 94.1, 60, 110.1, 94.3, 94.2, 60.1

[56] References Cited

U.S. PATENT DOCUMENTS

| | | | |
|---|---|---|---|
| 5,067,123 | 11/1991 | Hyodo et al. | 370/60 |
| 5,084,867 | 1/1992 | Tachibana et al. | 370/60 |
| 5,012,466 | 4/1991 | Buhrke et al. | 370/62 |
| 5,119,369 | 6/1992 | Tanabe et al. | 370/60 |
| 5,121,384 | 6/1992 | Ozeki et al. | 370/60 |
| 5,140,587 | 8/1992 | Mueller et al. | 370/85.15 |

FOREIGN PATENT DOCUMENTS

| | | |
|---|---|---|
| 0100106 | 2/1984 | European Pat. Off. |
| 0393351 | 10/1990 | European Pat. Off. |
| 0419019 | 3/1991 | European Pat. Off. |
| 2-272938 | 11/1990 | Japan |

OTHER PUBLICATIONS

H.-W. Wellhausen et al.: "Fehlerhäufigkeitsmessungen," *NTZ Nachrichtentechnische Zeitschrift,* vol. 24, No. 11, Nov. 1971, pp. 553–557.

P. Swartz: "Pseudo–Zufallsgenerator auf einem AGA–Chip," *Elektronik,* vol. 37, No. 12, Jun. 10, 1988, Muchen, DE, pp. 97–100.

H. W. Arweiler et al.: "MeBtechnik für zukünftige Breitbandsysteme," *NTZ Nachrichtentechnische Zeitschrift,* vol. 43, No. 12, 1990, pp. 888–893.

*Primary Examiner*—David C. Cain
*Attorney, Agent, or Firm*—Staas & Halsey

[57] ABSTRACT

A system for monitoring an ATM cross-connecting apparatus by inputting a test cell through a path for a main signal into the ATM cross-connecting apparatus, and examining the cell after the cell passed through the ATM cross-connecting apparatus. An initial value of a PN sequence and the PN sequence generated based on the initial bit sequence is written in the test cell before inputting to the ATM cross-connecting apparatus. When examining the test cell, the initial bit sequence and the PN sequence are read from the cell, a PN sequence is generated based on the initial bit sequence, and the generated pseudo-noise sequence is then compared with the PN sequence read from the test cell to detect an error in the test cell. In addition, a bit pattern indicating a primitive polynomial to generate the PN sequence may be written in the test cell. In this case, the bit pattern is used for generating the PN sequence when examining the test cell. Further, the same VPI values may be written in both the header and the information field of the test cell before inputting the cell to the ATM cross-connecting apparatus, and the VPI value in the information field is compared with a VPI value in the header of the test cell when examining the test cell.

11 Claims, 9 Drawing Sheets

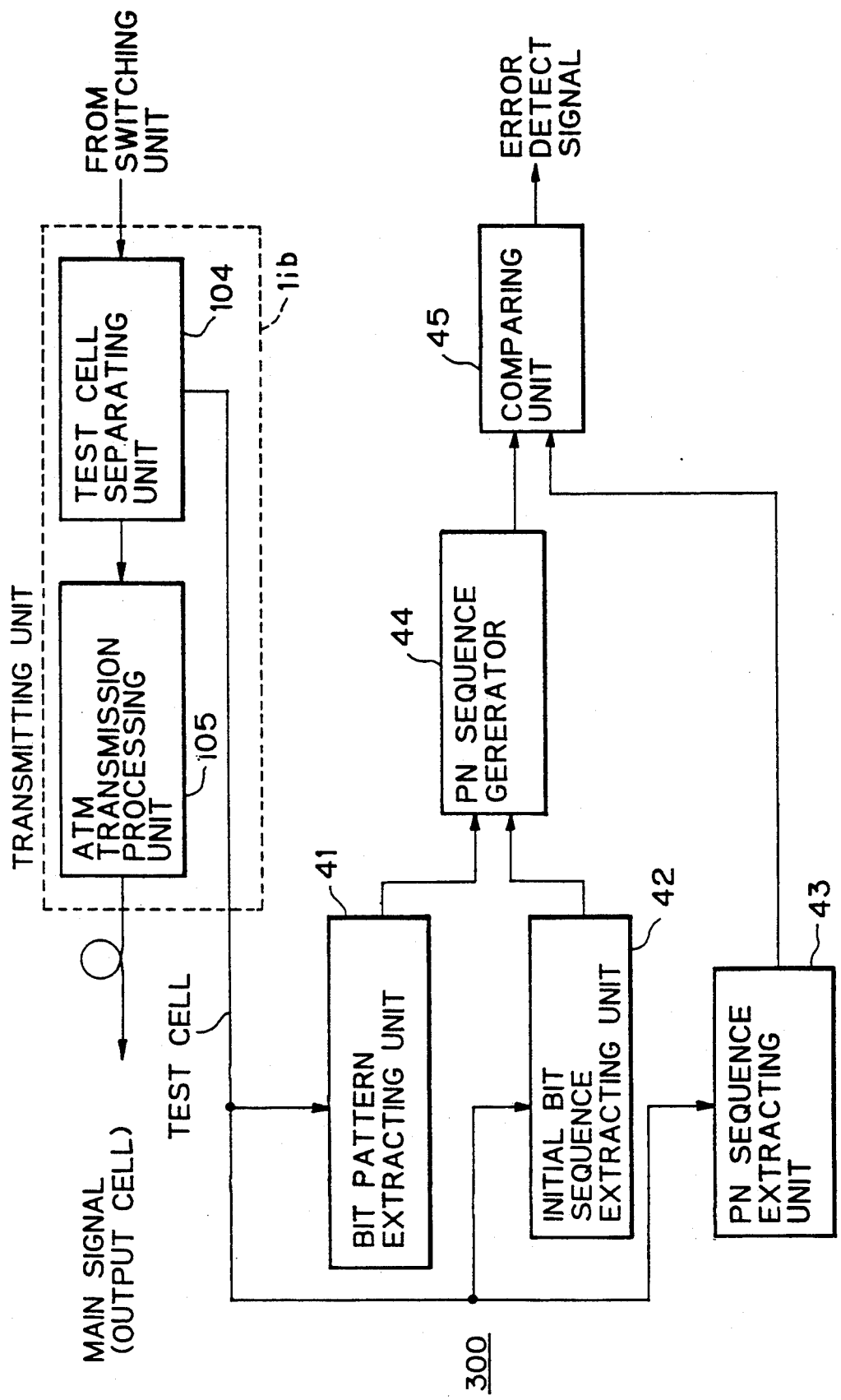

SYSTEM FOR MONITORING ATM CROSS-CONNECTING APPARATUS BY INSIDE-APPARATUS MONITORING CELL

BACKGROUND OF THE INVENTION

(1) Field of the Invention

The present invention relates to a system for monitoring an ATM cross-connecting apparatus by inputting a test cell through a normal signal path into the ATM cross-connecting apparatus, and examining the cell after the cell passes through the ATM cross-connecting apparatus.

(2) Description of the Related Art

In ATM (Asynchronous Transfer Mode) networks, virtual paths are cross-connected (switched) by an ATM cross-connecting (virtual path switching) apparatus, which is generally provided in nodes in the ATM network. In each ATM cross-connecting apparatus, a virtual path identifier (VPI) in each cell incoming thereto is rewritten in accordance with a virtual path identifier conversion table, and the cell is cross-connected to another virtual path in accordance with a routing table.

Conventionally, to monitor the normality of the operation of the ATM cross-connecting apparatus, an OAM (Operation, Administration, and Maintenance) cell is transferred as a test cell through a path of the main signal (signal representing information to be transmitted between users of the ATM network), and the content of the transferred OAM cell is examined.

However, conventionally, the content of the above OAM cell as a test cell is written by software in a controller of the ATM cross-connecting apparatus in a node, and is examined by software in the same controller of the ATM cross-connecting apparatus or a controller of another ATM cross-connecting apparatus in the next node to which the OAM cell is transmitted from the ATM cross-connecting apparatus. The testing and monitoring by OAM cell transmission is carried out for every virtual path connected to the ATM cross-connecting apparatus, and the content of information fields of the OAM cells must be various data (bit) patterns. Therefore, a heavy load is imposed on processors in the controller of the ATM cross-connecting apparatuses. In addition, the above various patterns must be stored from the time the patterns are written in the OAM cell until the content of the transferred OAM cell are respectively compared with the stored patterns (examined). Further, the stored patterns may be transferred to the next node when the examination is carried out in the next node. Since the size of the information field is 48 bytes, memory areas of considerable size are required to store the above patterns, and a considerable amount of data (patterns) must be transferred to the next node. Otherwise, the patterns to be written in the OAM cells may be delivered from a central monitoring apparatus to each pair of nodes when the OAM cells are input to an ATM cross-connecting apparatus in one of the pair of nodes and are examined in the other of pair of the nodes. In this case, a large amount of data (patterns) must be delivered to the pair of nodes.

SUMMARY OF THE INVENTION

An object of the present invention is to provide a system for monitoring an ATM cross-connecting apparatus wherein a load imposed on software in a controller of the ATM cross-connecting apparatus is reduced.

Another object of the present invention is to provide a system for monitoring an ATM cross-connecting apparatus wherein a whole bit pattern written in a test cell is not required to be supplied for examining the test cell after being cross-connected in the ATM cross-connecting apparatus.

According to the first aspect of the present invention, there is provided a system for monitoring an ATM cross-connecting apparatus by transmitting a test cell through a path for a main signal into the ATM cross-connecting apparatus. The system examines the cell after the cell passes through the ATM cross-connecting apparatus. The ATM cross-connecting apparatus contains: a plurality of input ports, a plurality of output ports, and a switching unit for cross-connecting the plurality of input ports with the plurality of output ports in accordance with given routing information. For each input port of the ATM cross-connecting apparatus, the system comprises: a first sequence generating unit for transmitting an initial bit sequence having a predetermined length, and generating a PN sequence initiated by the initial bit sequence; a test cell generating unit for generating a test cell comprising the initial bit sequence and the PN sequence generated as above; and a test cell inputting unit for inputting the test cell in the ATM cross-connecting apparatus through the input port. For at least one of the output ports of the ATM cross-connecting apparatus, which is connected with each input port through the ATM cross-connecting apparatus, the system further comprises: a test cell receiving unit for receiving the test cell output from at least the one output port; an initial bit sequence extracting unit for extracting the initial bit sequence written in the test cell received through the output port; a PN sequence extracting unit for extracting the PN sequence from the test cell output from at least the one output port; a second PN sequence generating unit, having the same construction as said first PN sequence generating unit, for generating a PN sequence initiated by the initial bit sequence extracted by the initial bit sequence extracted unit; a comparing unit for comparing the extracted PN sequence with the PN sequence generated in the second PN sequence generating unit initiated by the extracted initial bit sequence, said comparing unit transmitting an error detect signal if the two PN sequences are not equal.

According to the second aspect of the present invention, there is provided a system for monitoring an ATM cross-connecting apparatus by inputting a test cell through a path for a main signal into the ATM cross-connecting apparatus, and examining the cell after the cell passes through the ATM cross-connecting apparatus. The ATM cross-connecting apparatus comprises: a plurality of input ports, a plurality of output ports, and a switching unit for cross-connecting the plurality of input ports with the plurality of output ports in accordance with given routing information. For input port of the ATM cross-connecting apparatus, the system comprises: a first sequence generating unit for transmitting information indicating a primitive polynomial to be used for generating a PN sequence and an initial bit sequence having a predetermined length, and generating a PN sequence based on the primitive polynomial initiated by the initial bit sequence; a test cell generating unit for generating a test cell containing the above information on the primitive polynomial the initial bit sequence, and the PN sequence; and a test cell inputting unit for inputting the test cell in the ATM cross-connecting apparatus through the input port. For at least one of the output ports of the ATM cross-connecting apparatus, which is connected with each input port through the ATM cross-connecting apparatus, the system further comprises: a test cell receiving unit for receiving the test cell output from at least the one output port; a primitive polynomial information extracting unit for extracting the above information on the primitive polynomial to be used for generating the PN sequence from the received test cell; an initial bit sequence extracting unit for extracting the initial bit sequence written in the test cell received through the output port; a PN sequence extracting unit for extracting the above PN sequence from the test cell output from at least the one output port; a second PN sequence generating unit for generating a PN sequence based on the primitive polynomial indicated by the extracted information and initiated by the extracted initial bit sequence; a comparing unit for comparing the extracted PN sequence with the PN sequence generated in the second PN sequence generating unit initiated by the extracted initial bit sequence, said comparing unit transmitting an error detect signal if the two PN sequences are not equal.

According to the third aspect of the present invention, there is provided a system for monitoring an ATM cross-connecting apparatus by transmitting a test cell comprised of a header and an information field and containing a first virtual path identifier in the header, through a path for a main signal into the ATM cross-connecting apparatus, and examining the cell after the cell passes through the ATM cross-connecting apparatus. The ATM cross-connecting apparatus comprises: a plurality of input ports; a plurality of output ports; a virtual path identifier converting unit for converting the first virtual path identifier contained in the test cell into a second virtual path identifier, which is predetermined corresponding to the first virtual path identifier; and a switching unit for cross-connecting the plurality of input ports with the plurality of output ports in accordance with given routing information. For each input port of the ATM cross-connecting apparatus, the system comprises: a test cell generating unit for generating a test cell containing, in addition to the first virtual path identifier in the header, the same first virtual path identifier in the information field thereof; and a test cell inputting unit for inputting the test cell in the ATM cross-connecting apparatus through the input port. For at least one of the output ports of the ATM cross-connecting apparatus, which is connected with each input port through the ATM cross-connecting apparatus, the system comprises: a virtual path identifier conversion information storing unit for storing information on the above conversions carried out in the above virtual path identifier converting unit corresponding to at least the one output port; a test cell receiving unit for receiving the test cell output from at least the one output port; a first virtual path identifier extracting unit for extracting the first virtual path identifier contained in the information field of the test cell received through the output port; a second virtual path identifier extracting unit for extracting the second virtual path identifier converted by the virtual path identifier converting unit and contained in the header of the test cell received through the output port; and an error detecting unit for determining whether or not the first virtual path identifier extracted from the information field correctly corresponds to the second virtual path identifier extracted from the header, the error detection unit transmits an error detect signal if the first and second virtual path identifiers do not correspond to each other.

BRIEF DESCRIPTION OF THE DRAWINGS

In the drawings:

FIG. 11 is a diagram indicating the construction provided for an output port connected with each input port of the ATM cross-connecting apparatus through the switching unit 3, in the test cell error detecting unit 300 according to the second embodiment of the present invention;

DESCRIPTION OF THE PREFERRED EMBODIMENTS

Figure 1:
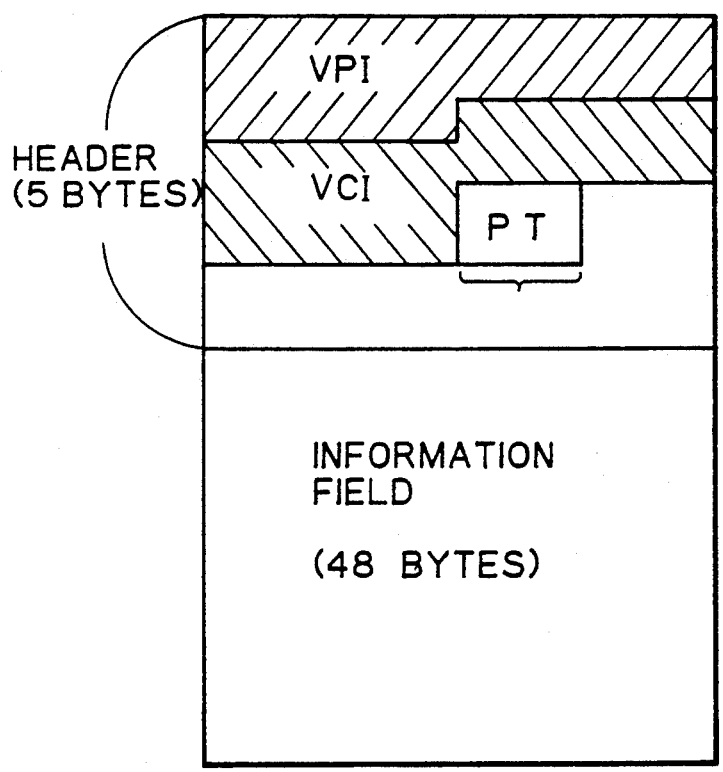
FIG. 1 is a diagram indicating a format of an ATM cell. As indicated in FIG. 1, the above-mentioned virtual path identifier (VPI) and a virtual channel identifier (VCI) for identifying a virtual path are written in the header area.

Format of Cell (FIG. 1)

FIG. 1 is a diagram indicating a format of an ATM cell. As indicated in FIG. 1, the above-mentioned virtual path identifier (VPI) and a virtual channel identifier (VCI) for identifying a virtual path are written in the header area. In addition, PT denotes a field of Pay Load Type, which is used to indicate whether the cell is used for a user, or is used as an OAM cell.

Figure 2:
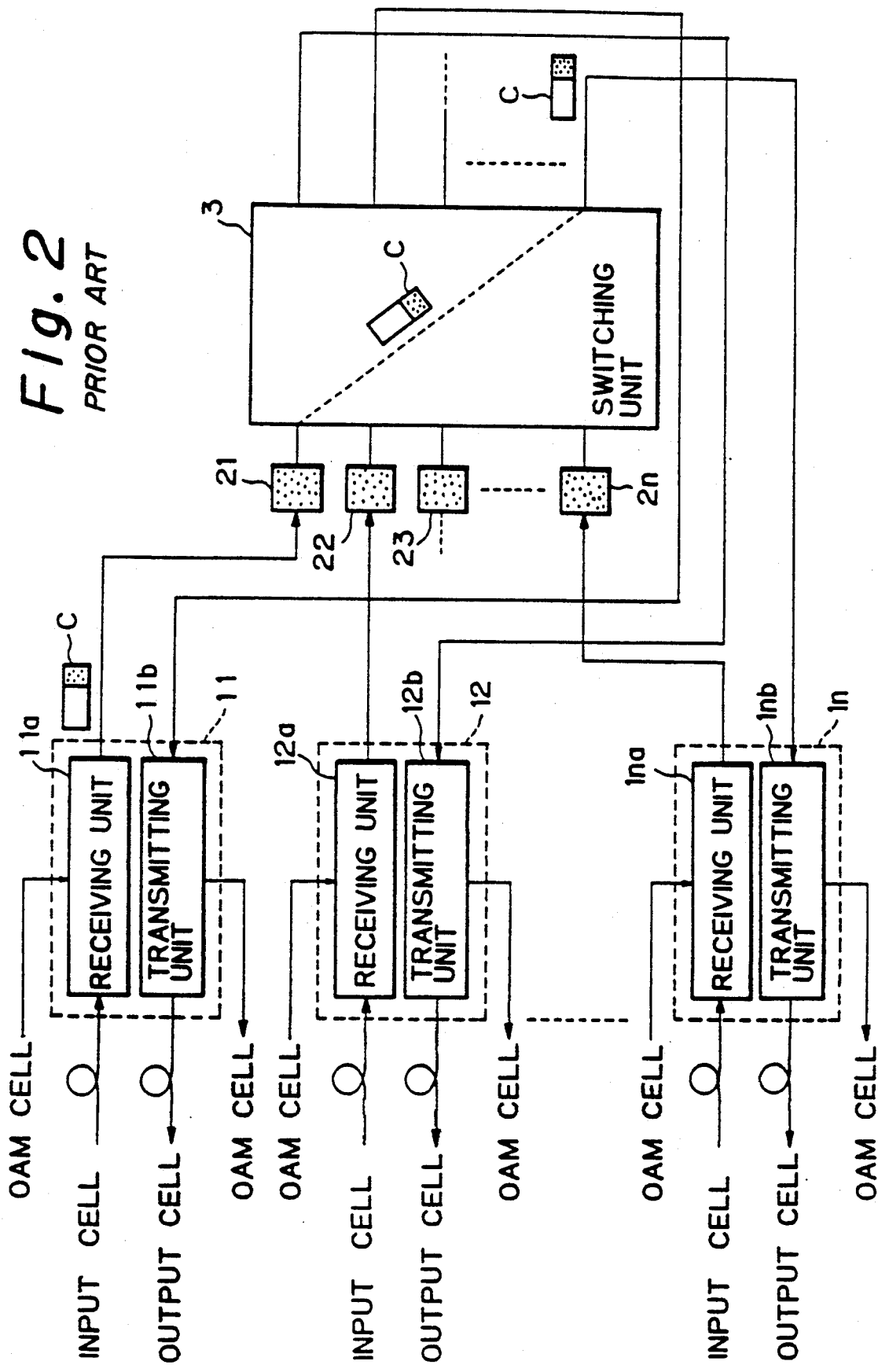
FIG. 2 is a diagram indicating an outline of the construction of a conventional ATM cross-connecting apparatus, and an example path of an OAM cell for testing the operation of the ATM cross-connecting apparatus.
Figure 3:
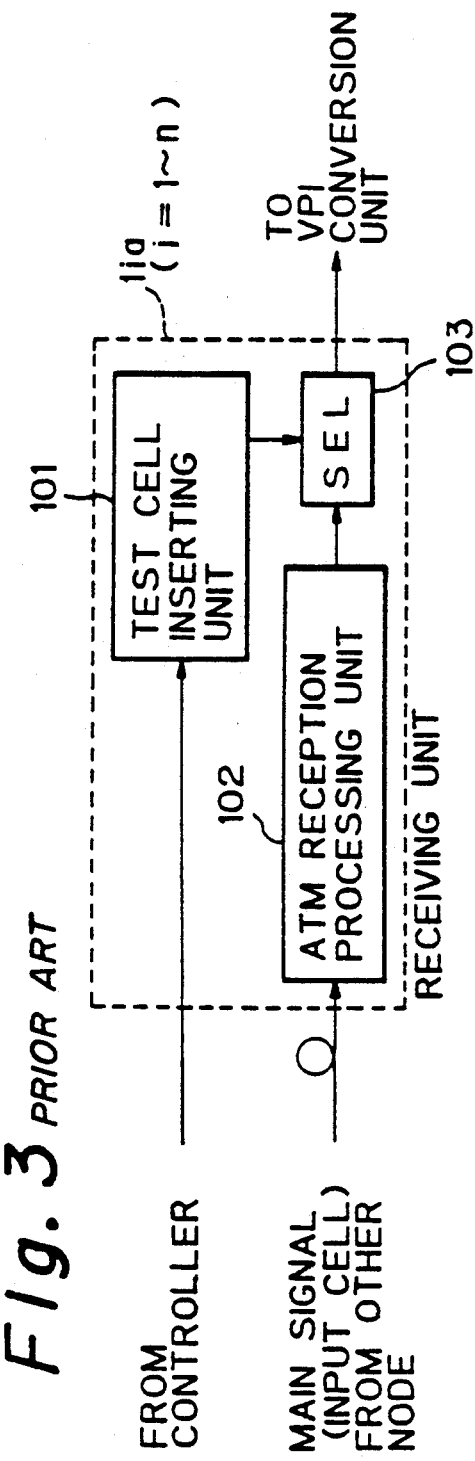
FIG. 3 is a diagram indicating the construction of the receiving unit $1ia$ (i=1 to n) in FIG. 2.
Figure 4:
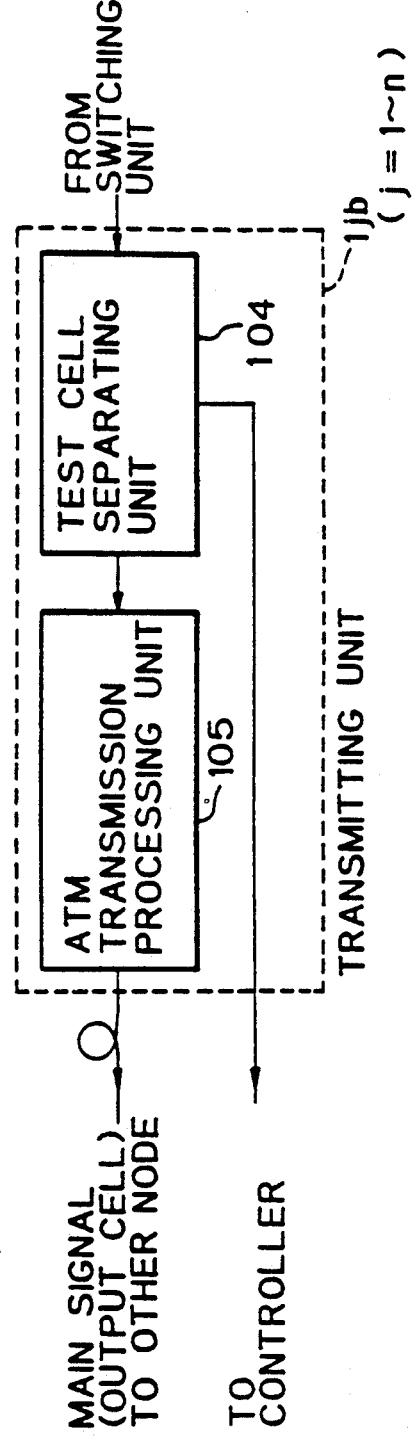
FIG. 4 is a diagram indicating the construction of the transmitting unit $1jb$ in FIG. 2.

Conventional Monitoring System (FIGS. 2, 3, and 4)

FIG. 2 is a diagram indicating an outline of the construction of a conventional ATM cross-connecting apparatus, and an example path of an OAM cell for testing the operation of the ATM cross-connecting apparatus. In FIG. 2, reference numerals $1i$ (i=1 to n) each denote an interface unit corresponding to each input/output port of the ATM cross-connecting apparatus, $1ia$ (i=1 to n) each denote a receiving unit, $1jb$ (j=1 to n) each denote a transmitting unit, $2i$ (i=1 to n) each denote a virtual path identifier (VPI) conversion unit, and 3 denotes a switching unit. An incoming cell transferred from another node or a terminal is received by the receiving unit $1ia$ (i=1 to n) in each interface unit $1i$, and is multiplexed therein. Then, a virtual path identifier (VPI) in each cell is replaced with another virtual path identifier (VPI) corresponding to a virtual path through which the cell is to be output to a next node. The replacement (conversion) of the virtual path identifier (VPI) is carried out in accordance with a virtual path identifier (VPI) conversion table (not shown) provided in each virtual path identifier (VPI) conversion unit $2i$.

The cell output from each virtual path identifier (VPI) conversion unit $2i$ is switched (cross-connected) to an output port of the switching unit 3, where the output port corresponds to another virtual path. The cell output from each output port of the switching unit 3 is applied to one of the transmitting units $1jb$ in one of the interface units $1i$ corresponding to the virtual path, is demultiplexed therein, and is then transmitted therefrom to the next node.

FIG. 3 is a diagram indicating the construction of the receiving unit $1ia$ (i=1 to n) in FIG. 2. In FIG. 3, reference numeral 101 denotes a test cell inserting unit, 102 denotes an ATM reception processing unit, and 103 denotes a selector. A main signal containing an input cell (containing information to be transmitted between users of the ATM network) is transferred from another node to the ATM reception processing unit 102. The ATM reception processing unit 102 contains a buffer memory (not shown), and the above input cell is temporarily written in the buffer memory. The input cell in the buffer memory is then transferred to the selector 103. On the other hand, test cells are generated in and supplied from the above-mentioned controller of the ATM cross-connecting apparatus (not shown) accompanied with the ATM cross-connecting apparatus. The test cell is temporarily held in the test cell inserting unit 101. When at least one input cell is held in the buffer memory, the selector 103 selects the input cell from the ATM reception processing unit 102 as its output, or when no input cell is held in the buffer memory in the ATM reception processing unit 102, the selector 103 selects the test cell supplied from the test cell inserting unit 101. Thus, the test cells are multiplexed with a flow of the input cells by the selector 103. The multiplexed cells are supplied to the virtual path identifier (VPI) conversion unit $2i$.

FIG. 4 is a diagram indicating the construction of the transmitting unit $1jb$ in FIG. 2. In FIG. 4, reference numeral 104 denotes a test cell separating unit, and 105 denotes an ATM transmission processing unit.

Each cell including either a cell of the main signal or a test cell, switched in the switching unit 3, is supplied to the test cell separating unit 104. In the test cell separating unit 104, test cells are separated from the other cells to be transmitted to the other node. The separation of each cell is carried out based on whether or not the field of the Pay Load Type indicates that the cell is an OAM cell. The separated test cells are supplied to the controller of the ATM cross-connecting apparatus, and the above cells to be transmitted to the other node are supplied to the ATM transmission processing unit 105. The ATM transmission processing unit also contains a buffer memory (not shown), and the above cells to be transmitted to the other node are temporarily held in the buffer memory, and are then transmitted therefrom to the other node.

Figure 5:
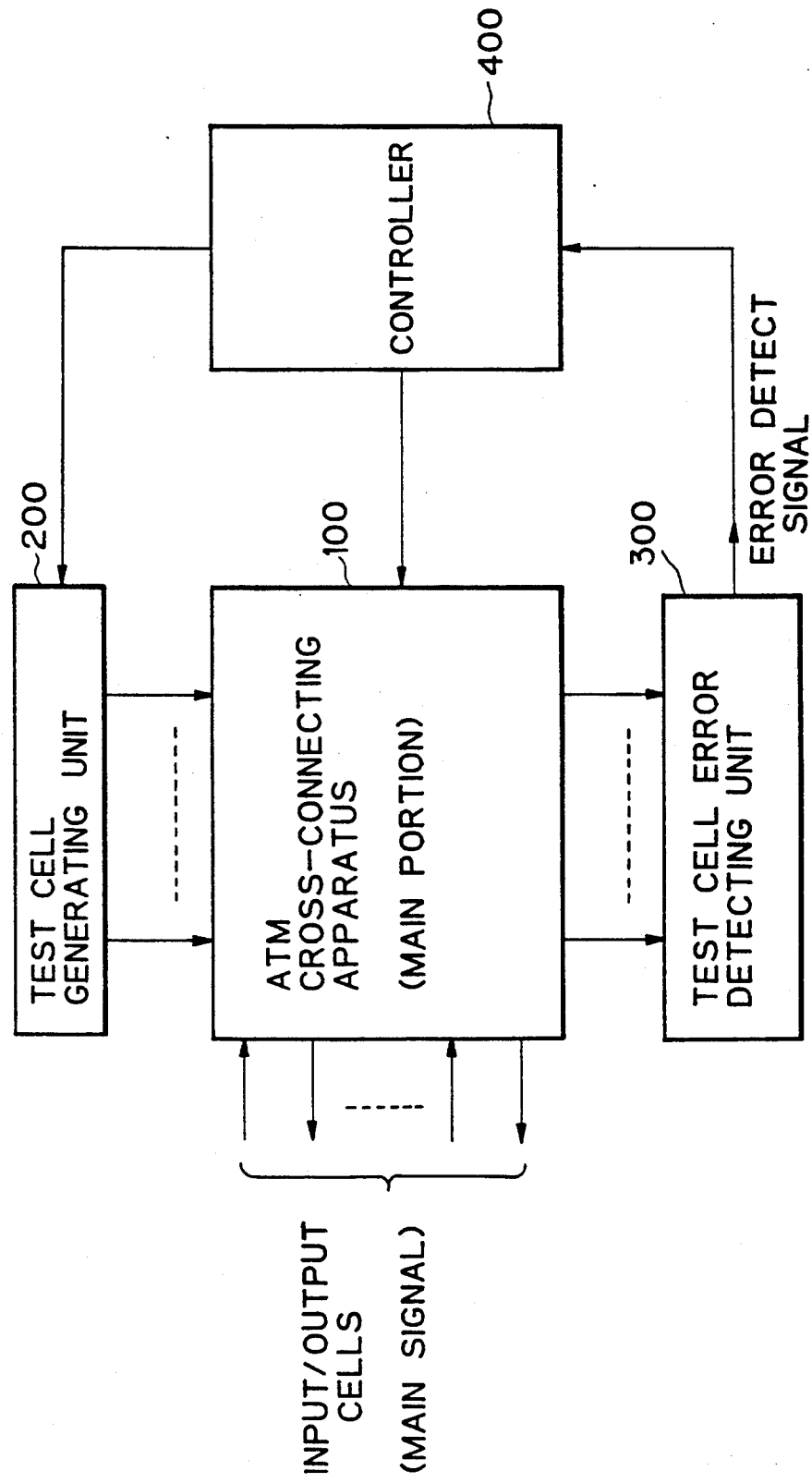
FIG. 5 is a diagram indicating an outline of the construction of the ATM cross-connecting apparatus according to the present invention.

Outline of ATM Cross-Connecting Apparatus (FIG. 5)

FIG. 5 is a diagram indicating an outline of the construction of the ATM cross-connecting apparatus according to the present invention. In FIG. 5, reference numeral 100 denotes a main portion of the ATM cross-connecting apparatus which has almost the same construction as indicated in FIGS. 2 to 4, 200 denotes a test cell generating unit, 300 denotes a test cell error detecting unit, and 400 denotes a controller of the ATM cross-connecting apparatus. The controller 400 writes the contents of the above-mentioned virtual path identifier (VPI) conversion table (not shown) and the routing table in accordance with instructions given from a central control station (not shown) controlling the whole ATM network. In addition, the controller of the ATM cross-connecting apparatus monitors the operation of the ATM cross-connecting apparatus in accordance with the present invention as explained below, and, when a malfunction of the ATM cross-connecting apparatus is detected, the malfunction is reported to the central control station. The test cell generating unit 200 and the test cell error detecting unit 300 are provided according to the present invention. The constructions and operations of these units 200 and 300 are explained below for first to third embodiments of the present invention, respectively.

Figure 6:
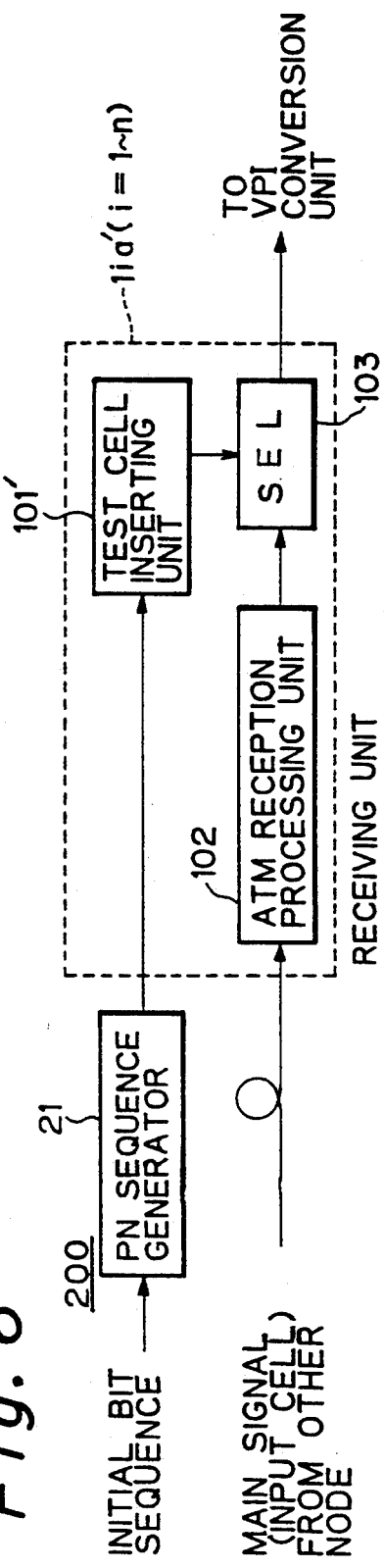
FIG. 6 is a diagram indicating the construction of the test cell generating unit 200 according to the first embodiment of the present invention.
Figure 8:
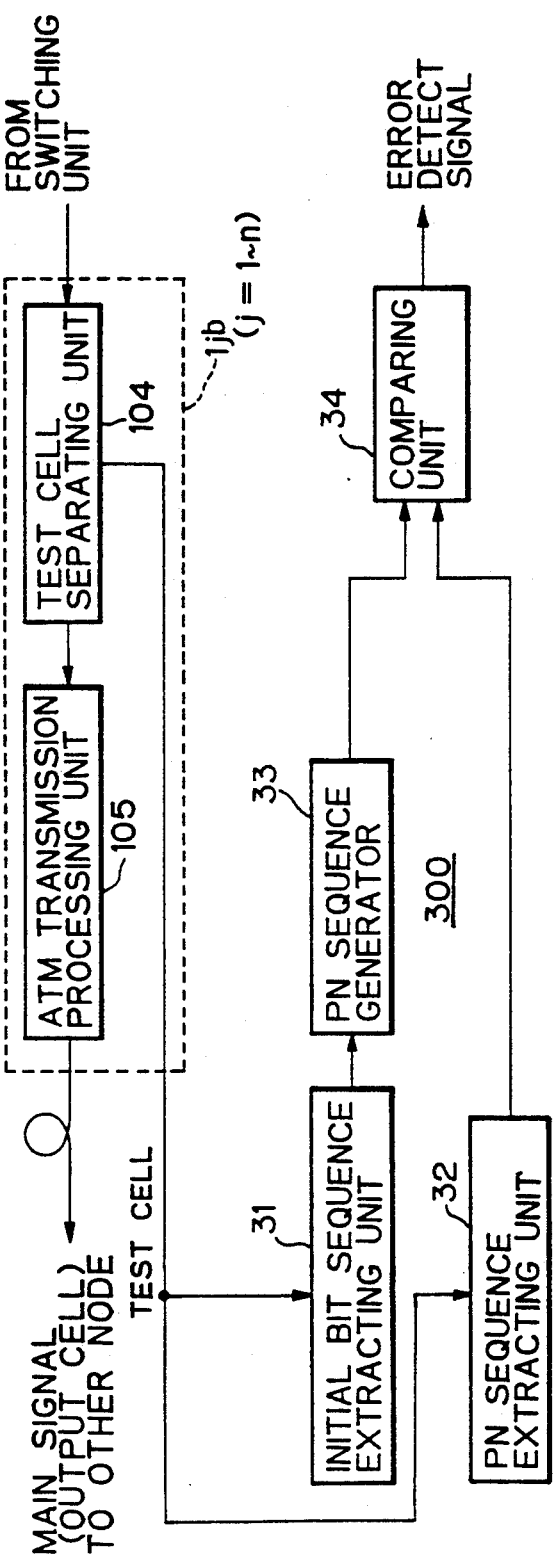
FIG. 8 is a diagram indicating the construction provided for an output port connected with each input port of the ATM cross-connecting apparatus through the switching unit 3, in the test cell error detecting unit 300 according to the first embodiment of the present invention.
Figure 7:
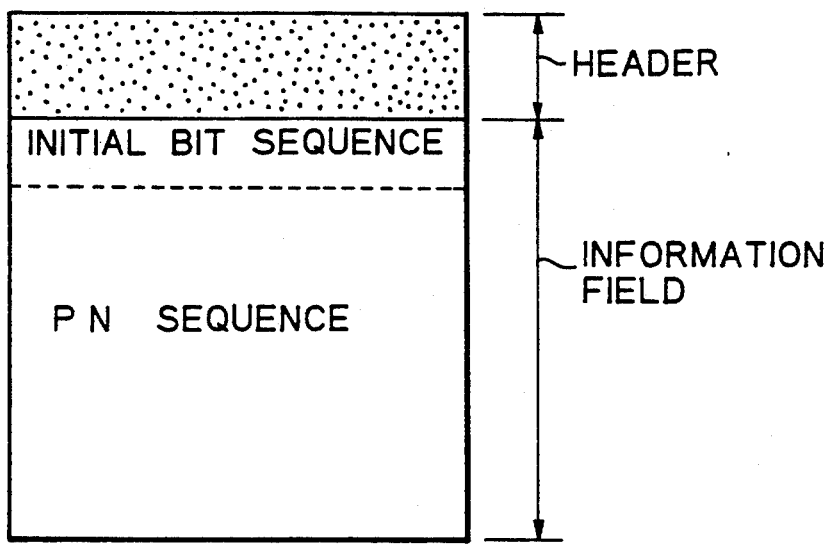
FIG. 7 is a diagram indicating the contents of the information field of the test cell in the first embodiment of the present invention.

First Embodiment (FIGS. 6, 7, and 8)

FIG. 6 is a diagram indicating the construction provided for each input port of the ATM cross-connecting apparatus in the test cell generating unit 200 according to the first embodiment of the present invention. In FIG. 6, reference numeral 21 denotes a PN sequence generator, and $1ia$ (i=1 to n) each denote a receiving unit. Namely, the test cell generating unit 200 according to the first embodiment of the present invention contains a PN sequence generator 21 for each receiving unit $1ia$. The PN sequence generator 21 comprises, for example, a m-stage shift register with linear feedback in accordance with a predetermined primitive polynomial of order m (where m is an integer). The PN sequence generator receives an initial bit sequence supplied from the controller 400, having a predetermined length at least equal to m, and generates a PN sequence initiated by the initial bit sequence and based on the predetermined primitive polynomial. The initial bit sequence and the PN sequence generated by the PN sequence generator 21' are supplied to the test cell inserting unit 101' in the receiving unit $1ia'$. The test cell inserting unit 101' generates a test cell by writing the initial bit sequence and the generated PN sequence in the information field as indicated in FIG. 7, and writing the indication that the cell is an OAM cell in the Pay Load Type field in the header. The test cell inserting unit 101' inserts the generated test cell between the flows of the input cells through the selector 103 in the same manner as the construction of FIG. 3. The other construction of the receiving unit 1ia' is the same as the construction of FIG. 3.

FIG. 8 is a diagram indicating the construction provided for an output port which is connected with each input port of the ATM cross-connecting apparatus through the switching unit 3, in the test cell error detecting unit 300 according to the first embodiment of the present invention. In FIG. 8, reference numeral 31 denotes an initial bit sequence extracting unit, 32 denotes a PN sequence extracting unit, 33 denotes a PN sequence generator, 34 denotes a comparing unit, and 1jb denotes the same construction of the transmitting unit of FIG. 4. The test cells are separated from the other cells to be transmitted to the other node, in the test cell separating unit 104 in the same manner as the construction of FIG. 4. The separated test cells are supplied to the initial bit sequence extracting unit 31 and the PN sequence extracting unit 32. The initial bit sequence extracting unit 31 extracts the initial bit sequence of the PN sequence from the area of the initial bit sequence in the information field of the test cell, and the PN sequence extracting unit 32 extracts the PN sequence from the area thereof in the information field of the test cell. The PN sequence generator 33 has the same construction as the PN sequence generator 21 provided for the input port connected with the output port through the switching unit 3. The PN sequence generator 33 generates a PN sequence initiated by the initial bit sequence extracted by the initial bit sequence extracting unit 31, and based on the same primitive polynomial as the above PN sequence generator 21. The comparing unit 34 compares the PN sequence generated in the PN sequence generator 33 with the PN sequence extracted by the PN sequence extracting unit 32, and outputs an error detect signal to the controller 400 when any difference between both the PN sequences is detected.

Thus, according to the above construction of the first embodiment of the present invention, if an error occurs in the area of the initial bit sequence of the PN sequence in the information field of the test cell, the PN sequence generator generates a PN sequence different from the PN sequence generated in the PN sequence generator 21, and therefore, the error is detected as the difference between both the PN sequences. In addition, if an error occurs in the area of the PN sequence in the information field of the test cell, the error is detected as the difference between both the PN sequences.

Further, since all of the constructions of FIGS. 6 and 8 are realized by a hardware logic circuit of a small size, no heavy load is imposed on the controller 400. Namely, the controller 400 of the ATM cross-connecting apparatus is required only to supply the initial bit sequence of a PN sequence to be generated, and monitor the error detect signal output from the comparing unit 34 of FIG. 8.

Figure 10:
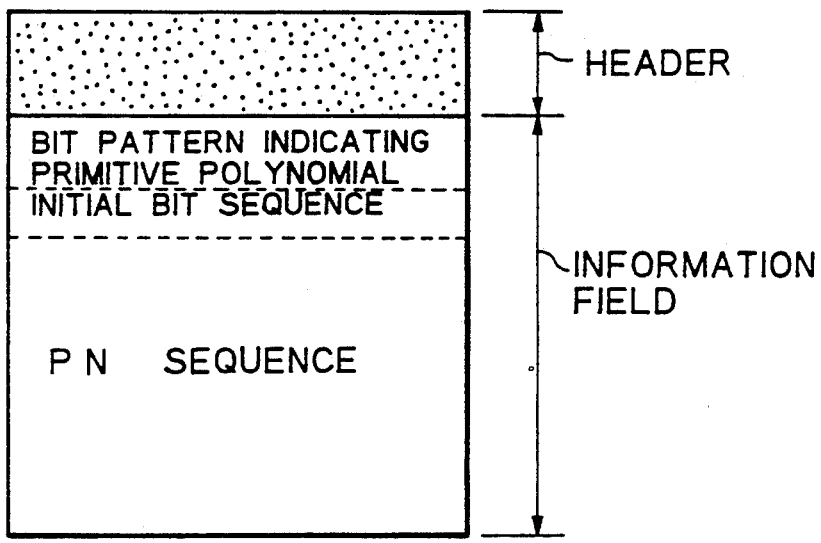
FIG. 10 is a diagram indicating the contents of the information field of the test cell in the second embodiment of the present invention.
Figure 9:
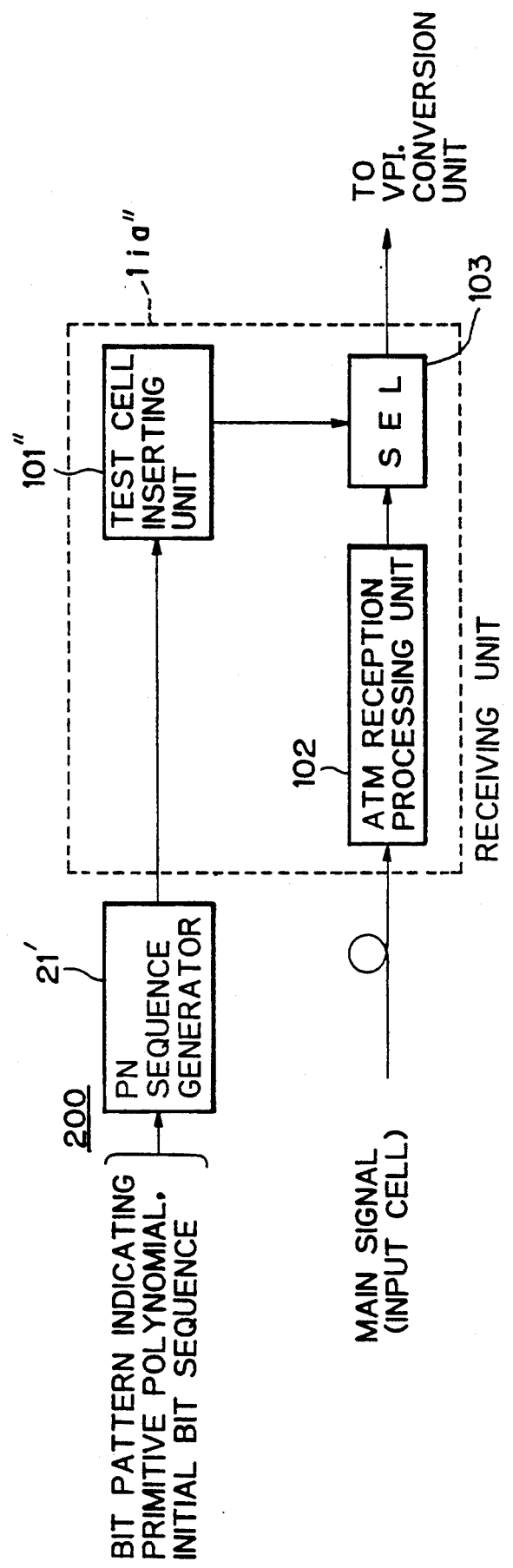
FIG. 9 is a diagram indicating the construction of the test cell generating unit 200 according to the second embodiment of the present invention.

Second Embodiment (FIGS. 9, 10, and 11)

FIG. 9 is a diagram indicating the construction provided for each input port of the ATM cross-connecting apparatus in the test cell generating unit 200 according to the second embodiment of the present invention. In FIG. 9, reference numeral 21' denotes a PN sequence generator, and 1ia" (i=1 to n) each denote a receiving unit. Namely, the test cell generating unit 200 according to the second embodiment of the present invention contains a PN sequence generator 21' for each receiving unit 1ia. The PN sequence generator 21' is comprised of a plurality of PN sequence generating circuits corresponding to a plurality of primitive polynomials, respectively. Each PN sequence generating circuit is constituted by a m-stage shift register with linear feedback in accordance with a corresponding primitive polynomial of order m (where m is an integer). The PN sequence generator 21' comprises a selector (not shown) for activating one of the plurality of PN sequence generating circuits if a bit pattern indicating a type of a primitive polynomial is supplied from the controller 400. Thus, PN sequence generator 21' functions as one of the plurality of PN sequence generating circuits designated by the bit pattern. The PN sequence generator 21' then inputs an initial bit sequence supplied from the controller 400 and having a predetermined length at least equal to m, and generates a PN sequence initiated by the received initial bit sequence and based on the primitive polynomial determined by the supplied bit pattern. Table 1 indicates examples of the bit patterns for some typical primitive polynomials.

TABLE 1

| | Bit Patterns and Primitive Polynomials | |
|---|---|---|
| ORDER | BIT PATTERN | PRIMITIVE POLYNOMIAL |
| 2 | 00000111 | $X^2 + X + 1$ |
| 3 | 00001101 | $X^3 + X^2 + 1$ |
| 5 | 00101001 | $X^5 + X^3 + 1$ |
| 7 | 11000001 | $X^7 + X^6 + 1$ |

The above bit pattern indicating the primitive polynomial, the initial bit sequence, and the PN sequence generated by the PN sequence generator 21' are supplied to the test cell inserting unit 101" in the receiving unit 1ia". The test cell inserting unit 101" generates a test cell by writing the bit pattern, the initial bit sequence, and the following PN sequence in the information field as indicated in FIG. 10, and writing the indication that the cell is an OAM cell in the Pay Load Type field in the header. The test cell inserting unit 101" inserts the generated test cell between the flows of the input cells through the selector 103 in the same manner as the construction of FIG. 3. The other construction of the receiving unit 1ia" is the same as the construction of FIG. 3.

FIG. 11 is a diagram indicating the construction provided for an output port connected with each input port of the ATM cross-connecting apparatus through the switching unit 3, in the test cell error detecting unit 300 according to the second embodiment of the present invention. In FIG. 11, reference numeral 41 denotes a bit pattern extracting unit, 42 denotes an initial bit sequence extracting unit, 43 denotes a PN sequence extracting unit, 44 denotes a PN sequence generator, 45 denotes a comparing unit, and 1jb denotes the same construction of the transmitting unit of FIG. 4. The test cells are separated from the other cells to be transmitted to the other node, in the test cell separating unit 104 in the same manner as the construction of FIG. 4. The separated test cells are supplied to the bit pattern extracting unit 41, the initial bit sequence extracting unit 42, and the PN sequence extracting unit 43. The bit pattern extracting unit 41 extracts the above bit pattern from the area of the bit pattern in the information field of the test cell. The initial bit sequence extracting unit 42 extracts the initial bit sequence of the PN sequence from the area of the initial bit sequence in the information field of the test cell, and the PN sequence extracting unit 43 extracts the PN sequence from the area thereof in the information field of the test cell. The PN sequence generator 44 has the same construction as the PN sequence generator 21' provided for the input port connected with the output port through the switching unit 3, and activates one of the plurality of PN sequence generating circuits therein in response to the bit pattern extracted by the bit pattern extracting unit 41. The PN sequence generator 44 generates a PN sequence initiated by the initial bit sequence extracted by the initial bit sequence extracting unit 42, and based on the primitive polynomial determined by the extracted bit pattern. The comparing unit 45 compares the PN sequence generated in the PN sequence generator 44 with the PN sequence extracted by the PN sequence extracting unit 43, and outputs an error detect signal to the controller 400 of the ATM cross-connecting apparatus if any difference between both the PN sequences is detected.

Thus, according to the above construction of the second embodiment of the present invention, if an error occurs in the area of the bit pattern indicating the primitive polynomial in the information field of the test cell, the PN sequence generator generates a PN sequence different from the PN sequence generated in the PN sequence generator 21', and therefore, the error is detected as the difference between both the PN sequences. In addition, the errors in the areas of the initial bit sequence and the PN sequence can be detected in the same manner as the first embodiment of the present invention.

Further, similar to the first embodiment, since all of the constructions of FIGS. 9 and 11 are realized by a small size hardware logic circuit, no heavy load is imposed on the controller 400 of the ATM cross-connecting apparatus. Namely, the controller 400 is required only to supply the bit pattern indicating a primitive polynomial and the initial bit sequence of a PN sequence to be generated, and monitor the error detect signal output from the comparing unit 45 of FIG. 11.

Figure 12:
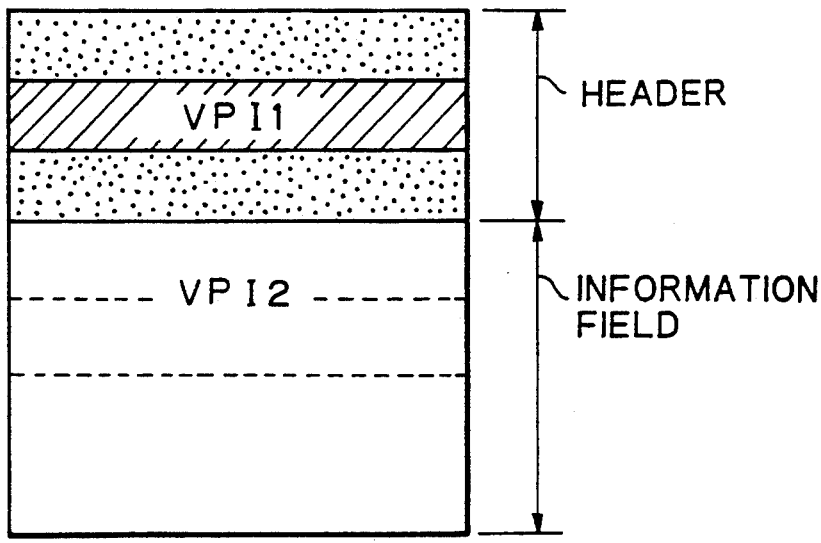
FIG. 12 is a diagram indicating the contents of the information field of the test cell in the third embodiment of the present invention.
Figure 13:
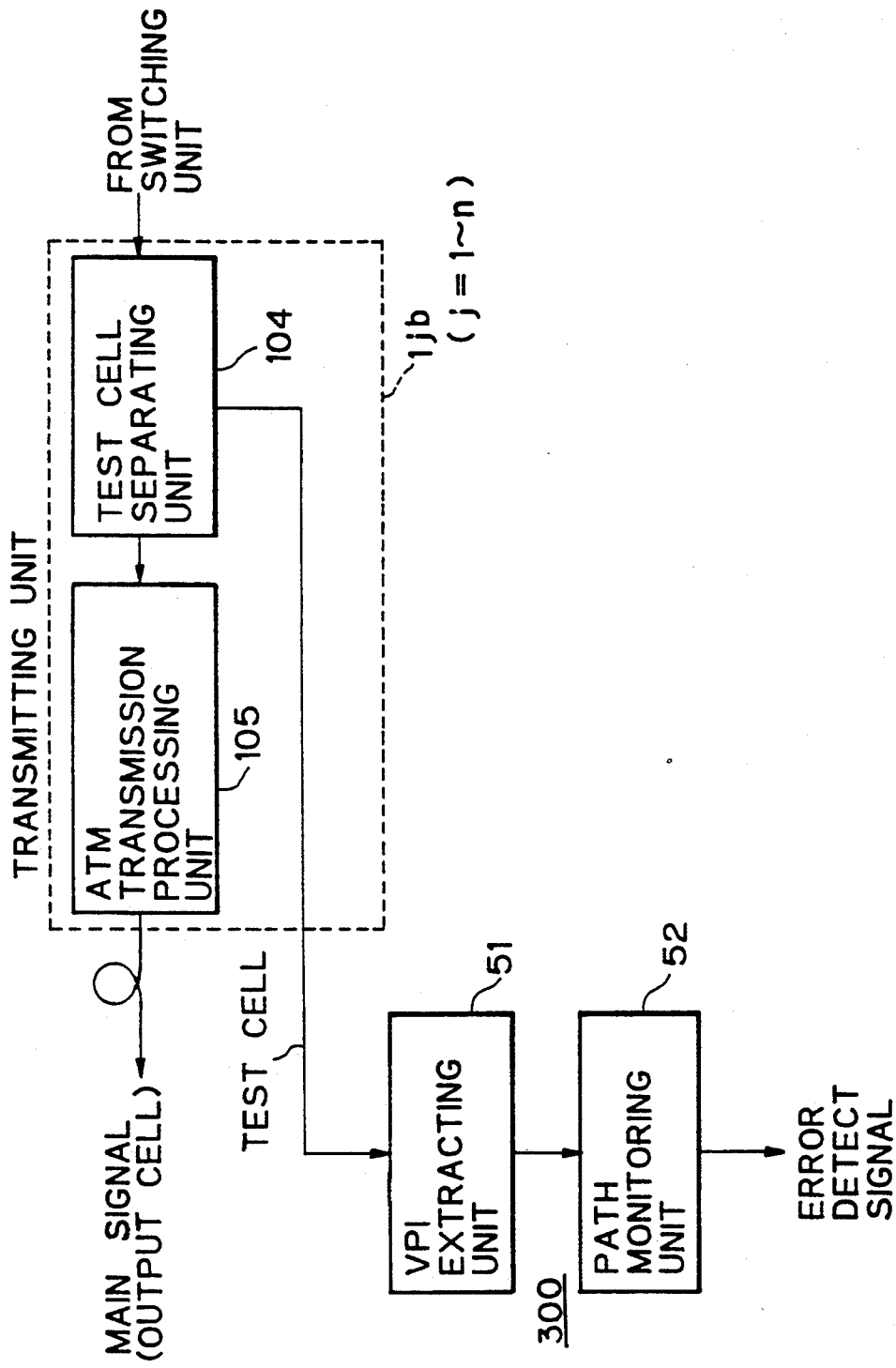
FIG. 13 is a diagram indicating the construction provided for an output port connected with each input port of the ATM cross-connecting apparatus through the switching unit 3, in the test cell error detecting unit 300, according to the third embodiment of the present invention.

Third Embodiment (FIG. 12 and 13)

In the third embodiment of the present invention, no construction is provided as the test cell generating unit 200, and a test cell containing the same value as the virtual path identifier (VPI) written in the header of the test cell, in a predetermined area of the information field of the test cell, is supplied from the controller 400 of the ATM cross-connecting apparatus to the test cell inserting unit 101 of the receiving unit 1ia (i=1 to n). The construction of the receiving unit 1ia is the same as the construction of FIG. 4. FIG. 12 is a diagram indicating the test cell used in the third embodiment of the present invention. In FIG. 12, "VPI1" denotes the virtual path identifier (VPI) in the header, and :VPI2" denotes the area in which the same value as the virtual path identifier (VPI) in the header is initially written. The test cell is input into the ATM cross-connecting apparatus in the same manner as the construction of FIG. 4. Then, the virtual path identifier (VPI) in the header is re-written in the corresponding virtual path identifier (VPI) conversion unit 2i (i=1 to n) in accordance with the above-mentioned virtual path identifier (VPI) conversion table (not shown), and the test cell is switched in the switching unit 3 to one of the transmitting units 1jb (j=1 to n) corresponding to a virtual path determined in accordance with the above-mentioned routing table (not shown). The routing table contains information on connections between input ports and output ports of the switching unit 3.

FIG. 13 is a diagram indicating the construction provided for an output port connected with each input port of the ATM cross-connecting apparatus through the switching unit 3, in the test cell error detecting unit 300 according to the third embodiment of the present invention. In FIG. 13, reference numeral 51 denotes a virtual path identifier (VPI) extracting unit, 52 denotes a path monitoring unit, and 1jb denotes the same construction of the transmitting unit of FIG. 4. The test cells are separated from the other cells to be transmitted to the other node, in the test cell separating unit 104 in the same manner as the construction of FIG. 4. The separated test cells are supplied to the virtual path identifier (VPI) extracting unit 51. The virtual path identifier (VPI) extracting unit 51 extracts the value of the virtual path identifier (VPI) from the area VPI2 in the information field of the test cell. The extracted value of the virtual path identifier (VPI indicates the virtual path identifier (VPI) before being converted in the virtual path identifier (VPI) conversion table 2i (i=1 to n) if no error occurs in the area VPI2. The extracted value of the virtual path identifier (VPI) before the conversion is supplied to the path monitoring unit 52 together with the virtual path identifier (VPI) in the header of the test cell. In the path monitoring unit 52, the information relating to the output port of the switching unit 3 to which the transmitting unit 1jb is connected, is supplied from the controller, and is stored therein in advance. When receiving the above extracted value of the virtual path identifier (VPI) before the conversion, the path monitoring unit 52 determines whether or not the extracted value of the virtual path identifier (VPI) before the conversion corresponds to the virtual path identifier (VPI) in the header of the test cell, based on the above information relating to the output port of the switching unit 3 to which the transmitting unit 1jb is connected. If these virtual path identifier (VPI) values do not correspond to each other, the path monitoring unit 52 outputs an error detect signal to the controller 400 of the ATM cross-connecting apparatus.

The above virtual path identifier (VPI) values will not correspond to each other if the conversion of the virtual path identifier (VPI) in the virtual path identifier (VPI) conversion table 2i or the switching operation in the switching unit 3 is not carried out correctly. Thus, according to the above construction of the third embodiment of the present invention, the normality of the operation of converting the virtual path identifier (VPI) in the ATM cross-connecting apparatus, and the operation of the switching unit 3 can be monitored.

Similar to the first and second embodiments, since all of the constructions of FIGS. 9 and 11 are realized by a small size hardware logic circuit, no heavy load is imposed on the controller 400 of the ATM cross-connecting apparatus. Namely, the controller 400 is required only to supply the initial virtual path identifier (VPI) of the test cell, and monitor the error detect signal output from the path monitoring unit 52 of FIG. 12.

Other Variations

Although the above explanation is for the case wherein the test cell is generated and input into an ATM cross-connecting apparatus in a node, and the test cell output from the ATM cross-connecting apparatus is examined in the same node, it is possible to examine the test cell in the next nodes to which the test cells are transmitted from the node in which the ATM cross-connecting apparatus to be monitored is located. In this case, the provisions according to the first and second embodiments of the present invention are, in particular, advantageous because no information is required to be transmitted to the next nodes for carrying out the operations of the constructions of FIGS. 8 and 11 in the first and second embodiments, respectively. As explained before, in the conventional monitoring system, all data of the PN sequence must be transmitted to the next nodes for determining whether or not the test cell contains an error.

We claim:

1. A monitoring system for an asynchronous transfer mode cross-connecting apparatus, for re-writing a virtual path identifier of an input cell and outputting the input cell from an output port corresponding to the re-written virtual path identifier, comprising:
   a setting portion which sets an initial value of a pseudo-noise pattern and the pseudo-noise pattern, based on the initial value, in an information field in a monitoring cell, which is input into said asynchronous transfer mode cross-connecting apparatus; and
   a detecting portion which detects an error in the cell by extracting the pseudo-noise pattern and the initial value from the cell, as output by said asynchronous transfer mode cross-connecting apparatus, and compares the extracted pseudo-noise pattern with a pseudo-noise pattern based on the extracted initial value.

2. A monitoring system for an asynchronous transfer mode cross-connecting apparatus, for re-writing a virtual path identifier of an input cell and outputting the input cell from an output port corresponding to the re-written virtual path identifier, comprising:
   a setting portion which sets a bit pattern, as a basis of a primitive polynomial, an initial value of a pseudo-noise pattern and the pseudo-noise pattern, based on the initial value, in an information field in a monitoring cell which is input into said asynchronous transfer mode cross-connecting apparatus; and
   a detecting portion which detects an error in the cell by extracting the pseudo-noise pattern, the initial value and the bit pattern from the cell, as output by said asynchronous transfer mode cross-connecting apparatus, and compares the extracted pseudo-noise pattern with a pseudo-noise pattern, based on the extracted initial value and the extracted bit pattern.

3. A monitoring system for an asynchronous transfer mode cross-connecting apparatus, for re-writing a virtual path identifier of an input cell and outputting the input cell from an output port corresponding to the re-written virtual path identifier, comprising:
   a setting portion which sets the same value, as the virtual path identifier in a header portion of the cell, in an information field in a monitoring cell which is input into said asynchronous transfer mode cross-connecting apparatus; and
   a detecting portion which detects an error in the cell by extracting the virtual path identifier from the header portion of the cell and extracting the virtual path identifier from the information field of the cell, as output by said asynchronous transfer mode cross-connecting apparatus and compares the virtual path identifier, extracted from the header portion, with the virtual path identifier extracted from the information field.

4. The monitoring system for the asynchronous transfer mode cross-connecting apparatus as claimed in claim 1, wherein the cross-connecting apparatus carries normal cells and wherein the setting portion further comprises:
   a setting pseudo-noise sequence generator which generates the pseudo-noise pattern, based on the initial value and a primitive polynomial of order m, where m is an integer and in accordance with a prescribed procedure;
   a test cell inserting unit which receives the pseudo-noise pattern from the setting pseudo-noise sequence generator and which generates the cell by writing the initial value and the pseudo-noise pattern into the information field and by writing an indicator into a header of the cell, which indicator identifies the cell as the monitoring cell; and
   a selector which receives normal cells from the cross-connecting apparatus and the monitoring cell from the test cell inserting unit and which selectively transmits the monitoring cell and normal cells to the cross-connecting apparatus.

5. The monitoring system for the asynchronous transfer mode cross-connecting apparatus as claimed in claim 4, wherein the setting pseudo-noise sequence generator comprises an m-stage shift register with linear feedback in accordance with the primitive polynomial of order m.

6. The monitoring system for the asynchronous transfer mode cross-connecting apparatus as claimed in claim 4, wherein the detecting portion further comprises:
   a test cell separating unit which receives normal cells and the monitoring cell from the cross-connecting apparatus and separates the monitoring cell from the normal cells, based on the indicator in the header;
   a pseudo-noise sequence extracting unit which receives the monitoring cell from the test cell separating unit and extracts the pseudo-noise pattern from the information field of the monitoring cell;
   an initial bit sequence extracting unit which receives the monitoring cell from the test cell separating unit and extracts the initial value from the information field;
   a detecting pseudo-noise sequence generator which receives the extracted initial value from the initial bit sequence extracting unit and which generates the pseudo-noise pattern, based on the extracted initial value and the primitive polynomial and in accordance with identical prescribed procedure of the setting pseudo-noise sequence generator; and
   a comparing unit which receives the extracted pseudo-noise pattern from the pseudo-noise sequence extracting unit and the pseudo-noise pattern from the detecting pseudo-noise sequence generator, and which compares the extracted pseudo-noise pattern with the pseudo-noise pattern from the detecting pseudo-noise sequence generator and produces an error detect signal when the extracted pseudo-noise pattern does not equal the pseudo-noise pattern from the detecting pseudo-noise sequence generator.

7. The monitoring system for the asynchronous transfer mode cross-connecting apparatus, as claimed in claim 2, wherein the primitive polynomial has an order of m, where m is an integer.

8. The monitoring system for the asynchronous transfer mode cross-connecting apparatus, as claimed in claim 7, wherein the setting portion further comprises a setting pseudo-noise sequence generator comprising:
- a plurality of pseudo-noise generator circuits, wherein one of the pseudo-noise generator circuits corresponds to the primitive polynomial and the bit pattern; and
- a setting pseudo-noise sequence generator selector which activates the one of the plurality of pseudo-noise sequence generator circuits when the bit pattern identifies the corresponding one of the pseudo-noise generator circuits, so that the setting pseudo-noise sequence generator generates a pseudo-noise pattern, based on the initial value and the primitive polynomial, corresponding to the one setting pseudo-noise generator circuit identified by the bit pattern, and in accordance with a prescribed procedure.

9. The monitoring system for the asynchronous transfer mode cross-connecting apparatus as claimed in claim 8, wherein the setting pseudo-noise generator comprises a m-stage shift register with linear feedback in accordance with the primitive polynomial.

10. The monitoring system for the asynchronous transfer mode cross-connecting apparatus as claimed in claim 8, wherein the cross-connecting apparatus carries normal cells and wherein the setting portion further comprises:
- a test cell inserting unit, which receives the pseudo-noise pattern from the setting pseudo-noise sequence generator and which generates the monitoring cell by writing the bit pattern, the initial value and the pseudo-noise pattern into the information field and by writing an indicator into a header of the cell, which indicator identifies the cell as the monitoring cell; and
- a setting selector, which receives normal cells from the cross-connecting apparatus and the monitoring cell from the test cell inserting unit and which selectively transmits the monitoring cell and normal cells to the cross-connecting apparatus.

11. The monitoring system for the asynchronous transfer mode cross-connecting apparatus as claimed in claim 8, wherein the detecting portion further comprises:
- a test cell separating unit, which receives the normal cells and the monitoring cell from the cross-connecting apparatus and separates the monitoring cell from the normal cells, based on the indicator in the header;
- a pseudo-noise sequence extracting unit which receives the monitoring cell from the test cell separating unit and extracts the pseudo-noise pattern from the information field of the monitoring cell;
- an initial bit sequence extracting unit which receives the monitoring cell from the test cell separating unit and extracts the initial value from the information field;
- a bit pattern extracting unit, which receives the monitoring cell from the test cell separating unit and extracts the bit pattern from the information field;
- a detecting pseudo-noise sequence generator which receives the extracted initial value from the initial bit sequence extracting unit and receives the extracted bit pattern from the bit pattern extracting unit, and which generates the pseudo-noise pattern, based on the extracted initial value and a primitive polynomial, as identified by the extracted bit pattern, and in accordance with the identical prescribed procedure; and
- a comparing unit, which receives the extracted pseudo-noise pattern from the pseudo-noise sequence extracting unit and the pseudo-noise pattern from the detecting pseudo-noise sequence generator, and which compares the extracted pseudo-noise pattern with the pseudo-noise pattern from the detecting pseudo-noise sequence generator and produces an error detect signal when the extracted pseudo-noise pattern does not equal the pseudo-noise pattern from the detecting pseudo-noise sequence generator.

* * * * *

UNITED STATES PATENT AND TRADEMARK OFFICE
CERTIFICATE OF CORRECTION

PATENT NO. : 5,257,311
DATED : October 26, 1993
INVENTOR(S) : Hidetoshi Naito et al It is certified that error appears in the above-indentified patent and that said Letters Patent is hereby corrected as shown below:

On the title page, item [73] Assignee:

After "Japan", insert --; Nippon Telegraph and Telephone Corporation, Tokyo, Japan--.

Signed and Sealed this

Twentieth Day of September, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,257,311
DATED : October 26, 1993
INVENTOR(S) : Hidetoshi NAITO et al.

It is certified that error appears in the above-indentified patent and that said Letters Patent is hereby corrected as shown below:

Cover page, item [73] Assignee:

After "Japan", insert --; Nippon Telegraph and Telephone Corporation, Tokyo, Japan--.

Signed and Sealed this

Eighteenth Day of October, 1994

Attest:

BRUCE LEHMAN

*Attesting Officer*      *Commissioner of Patents and Trademarks*